United States Patent [19]
Spooner et al.

[11] 4,056,827
[45] Nov. 1, 1977

[54] OPTICAL SYSTEMS FOR THE DISPLAY OF VISUAL IMAGES

[75] Inventors: Archer Michael Spooner, South Nutfield; Paul Michael Murray, Tunbridge Wells, both of England

[73] Assignee: Redifon Limited, London, England

[21] Appl. No.: 626,546

[22] Filed: Oct. 28, 1975

[30] Foreign Application Priority Data

Oct. 30, 1974 United Kingdom ............... 46942/74

[51] Int. Cl.² ............................................. H04N 7/18
[52] U.S. Cl. ..................................... 358/87; 358/104; 358/225; 358/250; 350/170
[58] Field of Search ................. 178/6.8, 7.85, 7.88, 178/DIG. 20, DIG. 35; 350/170; 360/104, 87, 225, 250

[56] References Cited

U.S. PATENT DOCUMENTS

| 3,294,903 | 12/1966 | Goldmark | 178/6.8 |
| 3,560,642 | 2/1971 | Schroader | 178/DIG. 20 |
| 3,564,128 | 2/1971 | Hosterman | 178/7.88 |
| 3,659,920 | 5/1972 | McGlasson | 178/7.88 |
| 3,932,702 | 1/1976 | Shelly | 178/6.8 |

Primary Examiner—Howard W. Britton
Attorney, Agent, or Firm—Larson, Taylor and Hinds

[57] ABSTRACT

An optical display system for a craft navigation simulator providing a wide angle display of greater than 3:1 width/height format derived from a closed circuit television camera viewing a terrain model. A wide-angle scene viewed is divided into three or more parts at vertical boundaries all of which are off-center and folded by a first optical system into substantially square format, in which format the composite image is processed from camera tube to display tube. A second optical system reconstructs the original wide angle image. By this means, high definition of the image in the center region and, particularly, near the horizon, is maintained.

8 Claims, 14 Drawing Figures

FIRST IMAGE
(MODEL)

SECOND IMAGE
(CAMERA TUBE)

THIRD IMAGE
(C.R. TUBE)

FOURTH IMAGE
(PROJECTOR)

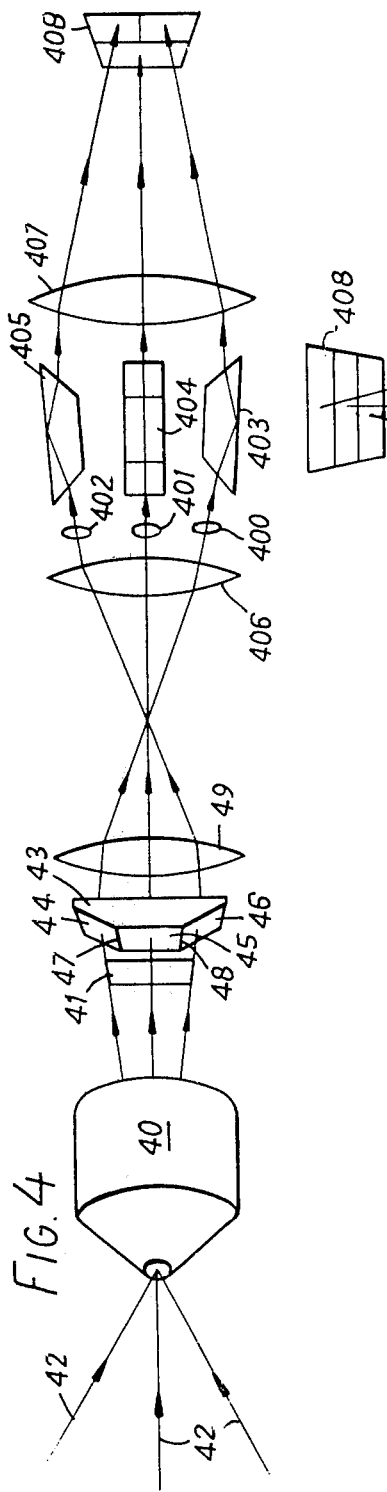
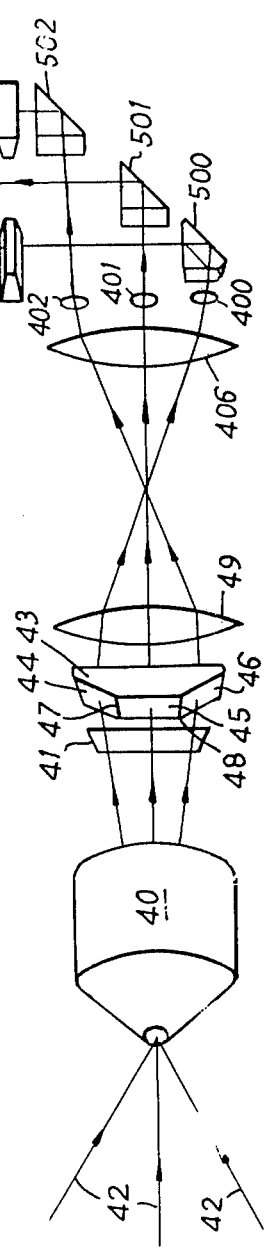
FIG. 4
FIG. 5

OPTICAL SYSTEMS FOR THE DISPLAY OF VISUAL IMAGES

This invention relates to optical systems for the display of visual images. In particular, the invention relates to optical systems for providing a visual display for craft navigation simulation apparatus.

In craft navigation simulation apparatus, such as aircraft flight or marine craft navigation simulation apparatus, it is common practice to provide a visual display for trainee crew which simulates the exterior view of the real world, such as would be seen by crew in an actual craft. Usually, such visual display is provided by a closed circuit television camera which is moved relatively to and views a terrain model. The view is reproduced to the trainee crew by a projected television display.

U.S. Pat. No. 3,932,702, which is incorporated herewith by reference, describes and claims such an optical display system, for the display of visual images, comprising a first optical system for viewing an object and providing a first image having a first format, a second optical system for dissecting said first image and providing a second sole image having a second format different from said first format said second format being substantially square, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format, in which the said second image comprises the said first image divided substantially vertically into left-hand and right-hand portions, the said portions being reassembled the one above the other in the said second format and the uppermost of the said left-hand and right-hand portions, when reassembled to form the second image, is inverted, thereby bringing together, in the second image, the upper edges of the two said front image portions.

The object of the present invention is to provide improvements in or modifications of the optical display system described and claimed in the patent abovementioned.

The electro optic system used is generally a closed circuit television camera. Thus, a square image most advantageously fills the circular target of the camera tube. However, a square format visual image is unsuitable for a visual display and a wide-angle display is required. The present invention enables a display of width:height ratio of 4:1, 9:1 and of greater ratio to be used, while retaining a square image on the camera tube target.

Accordingly, the present invention provides an optical display system, of the form defined, in which the said first image format and said fourth (final) image format are both wide-angle image formats, having at least three times as great width as height, and said first image is dissected into, and said fourth (final) image is reproduced from, at least three image parts separated at boundaries all of which are off-centre with respect to the said first and said fourth (final) images.

In the provision of a visual display for craft navigation simulation apparatus, objects of importance in the display occur most usually near the centre of the field of view. In the particular case of marine or river craft nagivation simulation apparatus, details of importance for navigation occur most usually on or just below the horizon, and particularly near the horizon at the centre of the field of view.

Furthermore, the human eye is more perceptive in the central region of the field of view than at side areas. Small distortions and imperfections of a displayed image, which are noticable and objectionable in the central region of the field of view, may be tolerated in side areas.

Both these factors demand that the most accurate optical presentation be achieved in the central area of the field of view and that imperfections, inherent in any such display system, be confined to side or marginal areas.

The present invention provides optical display systems, wherein the dissection of the first image and reconstruction of the final, displayed, image facilitates meeting these requirements.

In order that the invention may be readily carried into practice, several embodiments, showing different methods of image dissection and reconstruction, will now be described in detail, by way of example, with reference to the accompanying drawings, in which:

FIGS. 1(a), 1(b), 1(c) and 1(d) illustrate the known method of image dissection and reconstruction described in U.S. Pat. No. 3,932,702;

FIGS. 2(a) and 2(b) show an arrangement in which the first and final image formats are in approximately 4:1, width to height ratio and the intermediate format is substantially square;

FIGS. 3(a) and 3(b) show an arrangement in which the first and final image formats are in approximately 9:1, width to height ratio and the intermediate format is substantially square;

FIG. 4 shows a probe optical system to produce the image dissection and folding shown in FIG. 2(a);

FIG. 5 shows a probe optical system to produce the image dissection and translation shown in FIG. 3(a);

In FIGS. 1(a) to 1(d), there are shown the several stages of dissection and reconstitution of image parts in a known system, according to U.S. patent application Ser. No. 310533 in which a wide-angle scene is viewed by a closed circuit television camera and projected onto a screen before a trainee crew.

Figure 1A:
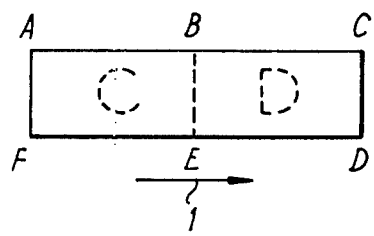

Thus, in FIG. 1(a), a first image A, B, C, D, E, F of a terrain model comprises two parts, a left hand part "C" and a right hand part "D". The left-to-right sense is shown by arrow 1.

Figure 1B:
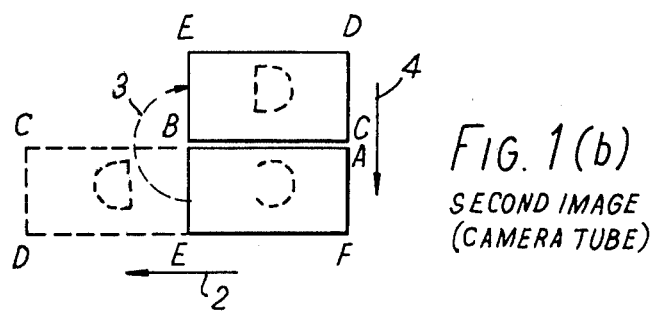

In FIG. 1(b), the image of FIG. 1(a) is both reversed left to right, as shown by arrow 2, and image part "D" is inverted over image part "C", as shown by arrow 3. This is the image which is focussed onto the target of the camera tube.

Figure 1C:
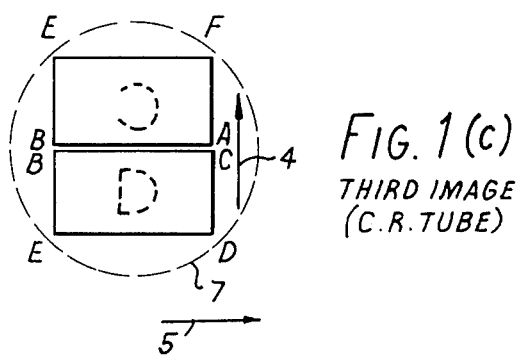

In FIG. 1(c), the image of FIG. 1(b) is inverted top to bottom, as shown by arrow 4 in the two figures. This is the image reproduced by the cathode ray tube of the television receiver.

Figure 1D:
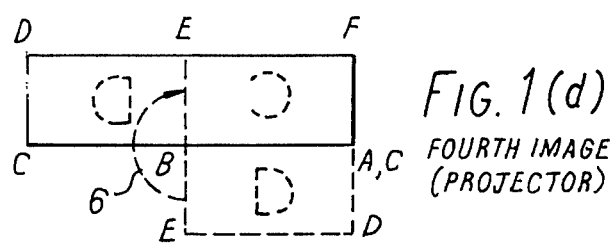

In FIG. 1(d), the image part "D" of FIG. 1(c) is rotated about point B, as shown by arrow 6, so that it is inverted and brought alongside image part "C". Thus, FIG. 1(d) reproduces the image of FIG. 1(a), in its original format but inverted top to bottom and reversed left to right, as shown by arrow 5. This is the image projected by the projector optics.

The image viewed by the trainee crew is again inverted and reversed by the projector optics, so that the viewed image is exactly as shown in FIG. 1(a).

It will be noted that the format of the first and final (projected) images is approximately 4:1, width to height. The format of the intermediate images is approximately square. The circular screen of the reproduction C.R. tube, which corresponds also to the target area of the camera tube, is shown by the brokenline circle 7 in FIG. 1(c).

The present invention is concerned with improvements and modifications in the manner of dissecting the original image, corresponding to FIG. 1(a) and is less concerned with the image reversals and invertions necessitated by the optical systems used. Hence, in the figures which follow, those reversals and invertions which relate solely to the optics are omitted, so that the invertions which form a part of the invention are the more clearly shown.

Figure 2A:
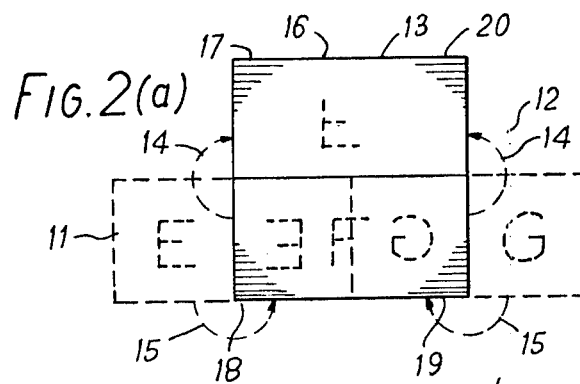
Figure 2B:
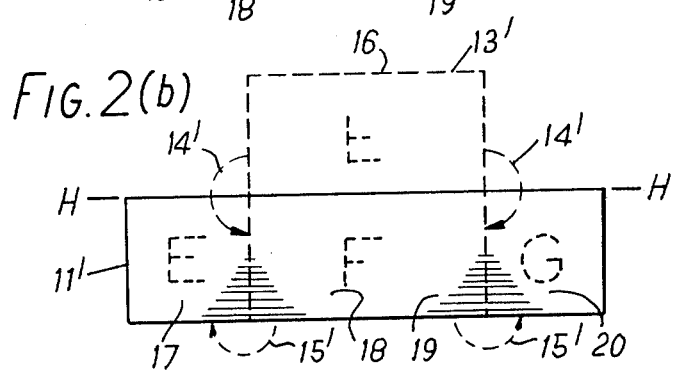

Thus, in FIGS. 2(a) and 2(b), there is shown a method by which the middle half of a wide-angle image of 4:1 width to height ratio, is inverted about its upper edge and the left and right outer quarters are reversed about their respective inner edges to give a square format image.

In FIG. 2(a) the wide-angle image is shown at 11, comprising a left-hand quarter "E", a central half "F" and a right-hand quarter "G". The circular area of a camera tube target is shown at 12 and the second image, on the tube target, is shown at 13. Image 13 comprises the central half "F" of image 11, which is inverted about its upper edge, as shown by arrows 14, the left-hand quarter "E" of image 11, which is reversed about its right-hand edge, as shown by arrow 15, and the right-hand quarter "G", which is similarly reversed about its left-hand edge, as shown by the arrow 15. The format of image 13 is substantially square.

It will be noted that the single figure FIG. 2(a) corresponds to the two figures FIG. 1(a) and FIG. 1(b) in that it shows the formats of the first and second images in the system.

It is well-known that any electron-optical imaging system introduces some degradation of the image in the marginal area at the edge of the (circular) field, due to electron lens imperfections in the camera tube and in the cathode ray or other display tube.

In FIG. 2(a), an inner circle 16 indicates the boundary of a central area of high-definition and it is assumed that some degradation of image occurs in the area between the circle 16 and the circle 12, with gives rise to degradation of areas in the corners of the image 13, as shown by the four shaded areas 17, 18, 19 and 20.

In FIG. 2(b), the single figure of which corresponds to both FIG. 1(c) and FIG. 1(d) in showing the third and fourth images, the square-format image 13 of FIG. 2(a) is reproduced at 13. The image part "F" is re-inverted. The image part "E" is reversed back and thus brought to the left of part "F" and the image part "G" is reversed back and brought to the right of part "F". In this manner, the original wide-angle image 11 is reproduced at 11'.

In this reconstruction of the original wide-angle image, however, degradation of the image at the corners is avoided. The areas 17, 18 of FIG. 2(a) are brought together in FIG. 2(b), as a generally triangular area extending upwardly from the bottom of the image, in the left half of the image and the areas 19, 20 are similarly brought together at the bottom of the image, in the right half.

If the top edge of the wide-angle image 11 coincides with the horizon of the terrain model, or slightly above the horizon to include skyline details, the reproduced horizon H-H of image 11' of FIG. 2(b) will extend through the central area of high definition of the images 13 and 13'. By this method, the areas of reduced detail, produced by the optics, and more particularly the electron optics, of the system, can be removed from the areas where the trainee crew require the maximum visual information for navigation requirements in the visual display provided with simulation apparatus.

Figure 3A:
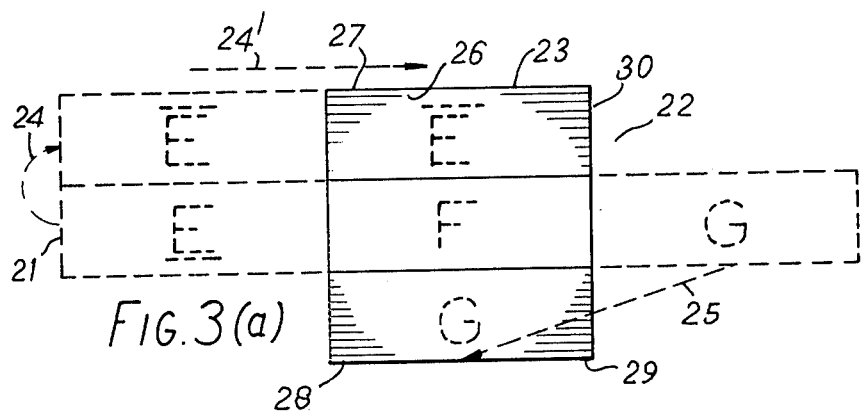

In FIG. 3(a), the original wide-angle view 21 is of 9:1, height-to-width format. The left-hand third of the image "E" is inverted as shown by arrow 24, and displaced to the right, to above the central third "F", as shown by arrow 24'. The right-hand third "G" is displaced downwardly and to the left, to below the central third "F", as shown by arrow 25. Thus, the image 23 formed on the target 22 of the camera tube is of substantially square format.

The camera tube area within circle 26 is taken as an area of high-definition and the corners 27, 28, 29, 30 of the image 23, represent areas of degraded definition.

Figure 3B:
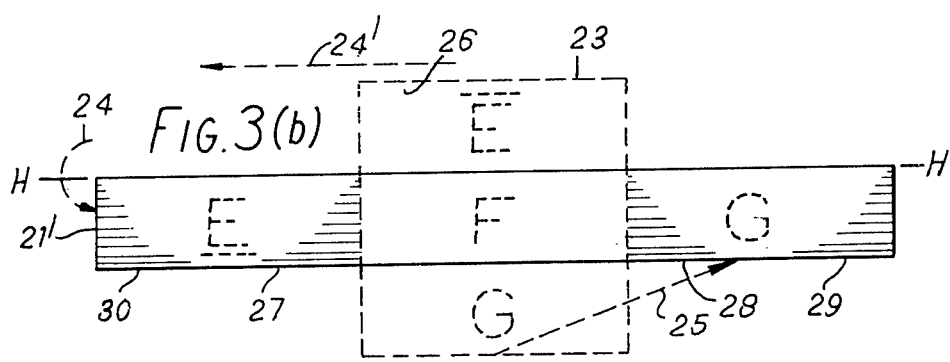

FIG. 3(b) shows the reconstruction of the original wide-angle image, referenced 21', by invertion and displacement of the image part "E" to the left-hand side of the image part "F", as shown by arrows 24 and 24', and by side and upwards displacement of the image part "G", to the right-hand side of image part "F", as shown by arrow 25'.

In the reconstructed wide-angle image 21', it will be noted that the areas 30, 27, 28, 29 of degraded detail lie at the base and at the sides of the wide-angle image 21', leaving the horizon area H—H in areas of high-definition.

It will be understood that FIG. 2(a) and FIG. 3(a) represent images at the model-viewing end of the closed-circuit television system and that FIG. 2(b) and FIG. 3(b) represent images at the reproduction and projection-display end of the system, for the respective systems.

It will be appreciated that in visual display systems for marine or river craft, or for land vehicles, roll is absent or negligible. Hence, such systems, with which the present invention is particularly concerned, are not subject to requirements of horizon tilt, as are visual displays for aircraft flight simulation. This fact facilitates the dissection and reconstruction of wide-angle images.

Further, with reference to the arrangement of FIG. 3(a) and FIG. 3(b), it may be noted that, if the wide-angle image 21 is narrowed to a format of, say, 7:1, height-to-width ratio, the left-hand and right-hand sixths of the inverted image "E" and of the displaced image "G" can be discarded, thereby largely avoiding all the areas 27, 28, 29, 30 of degraded detail.

Although in FIGS. 2(a), 2(b) and in FIGS. 3(a), 3(b) the areas of degraded detail are bounded by a circle, 16 and 26 respectively, in practice the extent of image degradation is likely to increase throughout an area, the degradation increasing with distance from the tube, and image, centre.

As a further modification of the system described with reference to FIGS. 3(a) and 3(b), a panoramic wide-angle view of 25:1, height-to-width format may be dissected into five equal image areas "D", "E", "F", "G" and "J", from left to right. Area "E" would be inverted over the central area "F" and area "G" would be displaced below area "F", as in FIG. 3(a) Extreme left hand area "D" would be inverted above area "E" and extreme right hand area "J" would be displaced below area "G", so that the dissected areas would be stacked in the order: "D" (inverted), "E" (inverted), "F", "G" and "J".

The image on the camera tube target and on the reproducing C.R. tube screen would again be of substantially square format. The corner areas, of the square-format image, of degraded detail would appear at bottom positions in the panoramic wide-angle view, providing a high-definition horizon area and the largest areas of degraded image would appear in the extreme left-hand and right-hand fifths of the wide-angle image.

FIG. 4 shows a probe optical system which produces the image folding effect shown in FIG. 2(a). In FIG. 4, a wide-angle lens 40 views and collects light rays 42 from a model surface, not shown, and forms a real image of the model in a plane 41. The plane 41 is defined by the focus of light rays forming the image; there is no physical surface upon which the image is formed. A refracting prism 43 is set close to the real image in plane 41. The prism 43 has three flat faces 44, 45 and 46 facing towards the image plane 41. These faces intersect at lines 47 and 48 which are parallel to the image plane 41. The light associated with the primary image is effectively divided at lines 47 and 48, light associated with the central section "F" of the image, see FIG. 2(a), falling on the centre face 45, and light associated with two outer sections "E" and "G" of the image falling respectively on outer faces 44 and 46.

The three faces 44, 45 and 46, being at angles to each other, refract light rays 42 associated with three separate image areas "E", "F" and "G" through different angles as indicated. A field lens 49 is set close to the prism 43. This field lens, in the absence of the prism 43, would form an image of the pupil of the front lens 40 at 401. Due to refractions at the prism 43, three separate pupil images 400, 401 and 402 are formed, through which pass light beams associated respectively with image areas falling on faces 44, 45 and 46 of the prism 43. Light passing through all three pupil images is collimated by collimating lens 406. Dove prisms 403, 404 and 405 are set at or close to pupil images 400, 401 and 402 respectively, so that these prisms deal respectively with light beams from image areas falling on faces 44, 45 and 46 of the prism 43. These image areas correspond to areas "E", "F" and "G" respectively, of FIG. 2(a). The prism 404 receives light from the central image area. "F" of FIG. 2(a), and inverts this image area bottom over top about its upper edge, which is an edge not adjoining another image area. The prisms 403, and 404 receive light from outer image areas, "E" and "G" respectively, of FIG. 2(a), and reverses these image areas side to side about their inner edges, that is the respective edges at which they adjoin the central area, "F". The net effect is a 180° rotation of the outer image areas with respect to the central area about inner corners, as indicated in FIG. 2(a). This reorientation of image areas is performed by prisms 403, 404 and 405 in collimated light. The collimated light emerging from all three prisms is then focussed by lens 407 to form a real image on a target surface 408. This image, when received from the front of the target, corresponds to the reassembled image of FIG. 2(a).

FIG. 5 shows a probe optical system which produces the image folding effect shown in FIG. 3(a). The probe system shown in FIG. 5 is in some respects similar in construction and operation to that shown in FIG. 4, and each corresponding feature is indicated by the same reference numeral in the two drawings.

Again, a wide angle lens 40, collects light rays 42 from a model, not shown and forms a real image in a plane 41. The plane 41 is defined by the focus of light rays forming the image; there is no physical surface upon which the image is formed. Light associated with three equal adjacent areas of this image is collimated and made to pass through three separate pupil images 400, 401 and 402 similarly as described with reference to FIG. 4, by a prism 43 having three flat faces 44, 45 and 46 intersecting at lines 47 and 48, a field lens 49 and a collimating lens 406. The three image areas falling on faces 44, 45 and 46 of the prism 43 correspond in this case respectively to the equal image areas "E", "F" and "G" of FIG. 3(a).

Collimated beams associated with these areas are passed through a system of three reflecting prisms 500, 501 and 502 and then refracting wedges 503 and 504, in order to produce the required image folding effect indicated in FIG. 3(a). The reorientation of images is produced in collimated light, after which all collimated beams are focussed by a lens 407 to form a real image on a target surface 408. Prism 501 receives light passing through pupil area 401, which is associated with the central image area falling on prism face 45. This image area corresponds to area "F" in FIG. 3(a). Prism 501 deflects the collimated beam from the central image area through an angle of 90° in the horizontal plane, defined as the plane orthogonal to lines 47 and 48. Prism 500 receives light passing through pupil area 400 which is associated with the outer image area falling on prism face 44. This image area corresponds to area "E" of FIG. 3(a).

Prism 500 deflects the collimated beam associated with the outer image area through an angle greater than 90° in the horizontal plane so that, after reflection at the prisms, the collimated beam associated with the outer image area is parallel with that associated with the central area.

Prism 502 receives light passing through pupil area 402 which is associated with the outer image area falling on prism face 46. This image area corresponds to area "G" of FIG. 3(a). Prism 502 deflects the collimated beam associated with this outer image area through an angle less than 90° in the horizontal plane so that, after reflection at the prisms 500, 501 and 502, the collimated beams associated with the three image areas are parallel with each other.

Refracting wedge 503 is introduced into the collimated beam reflected from prism 500, to deflect this beam in a direction orthogonal to the horizontal plane. Refracting wedge 504 is introduced into the collimated beam reflected from prism 502, to deflect this beam in a direction orthogonal to the horizontal plane, but opposite to the deflection direction produced by wedge 503. The refracting wedges 503, 504, thus separate the directions of the three collimated beams in a sense perpendicular to their initial separation. The resultant effect, realised in the final image formed on target surface 408, is that, outer image areas are repositioned with respect to the central area as indicated in FIG. 3(a).

Prisms 501 and 502 are made simple single-surface reflecting prisms, so that there is no relative inversion or rotation of their associated image areas, "F" and "G" of FIG. 3(a). But prism 500 is made a roof-reflecting prism as shown in FIG. 5, in order to invert the associated image area with respect to the other two image areas, as shown in FIG. 3(a).

Figure 6:
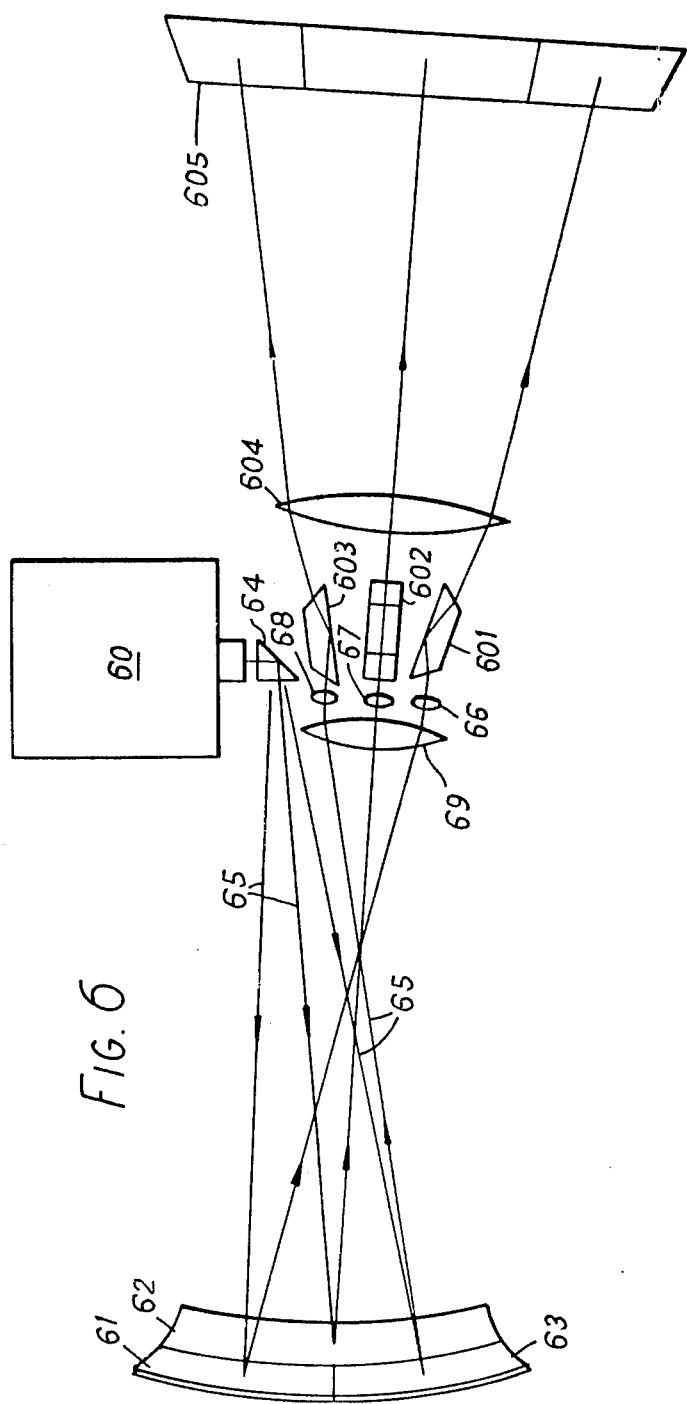
FIG. 6 shows an optical projection system to reconstruct a folded image, as shown in FIG. 2(b)

FIG. 6 shows an optical projection system which will reconstruct a folded image to produce a final picture having the original format, as shown in FIG. 2(b).

In FIG. 6, a television projector 60 is adjusted to throw a real image onto a group of three concave mirrors 61, 62 and 63. The projection path is folded, for convenience, by a simple reflecting prism 64. The projected image is of square format and in three parts, corresponding to the parts "E", "F" and "G" of FIG. 2(b). The three mirrors 61, 62 and 63 are shaped and arranged as shown in FIG. 6 so that mirror 61 receives the part corresponding to "G" of FIG. 2(b), mirror 62 receives that part corresponding to "F", and mirror 63 receives that part corresponding to "E". All of the three mirrors 61, 62 and 63 have a radius of curvature equal to their separation from the projector 60. However, the centres of curvature of all three mirrors are separated from the projector pupil and from each other. The result is that each mirror forms a separate image of the projector pupil close to the projector, mirror 61 at 66, mirror 62 at 67 and mirror 63 at 68. Through each of the pupil images 66, 67 and 68 passes all the light associated only with its associated image area. Light from all three primary image areas is collimated by a collimating lens 69 before reaching the pupil images.

Dove prisms 601, 602 and 603 are set at or close to the pupil images, as in the probe system described above with respect to FIG. 4, so that each dove prism deals with light from one of the three image areas. Prism 602 inverts top to bottom the image falling on mirror 62, corresponding to area "F" in FIG. 2(b), about the (top) edge at which it adjoins the other two image areas. Prisms 601 and 603 reverse the other two image areas "E" and "G" left to right about their outer edges. The result is the replacement of the two image areas "E" and "G" at the outer ends respectively of the larger, central area "F", as shown in FIG. 2(b).

The reorientation of images is performed by the dove prisms in collimated light. The reconstituted image is then formed on a display screen surface 605 by a lens 604. Ray paths are indicated throughout by lines 65.

It will be appreciated that the dove prisms system of FIG. 6 is similar to the dove prism system of FIG. 4, since the light paths through the folding system of FIG. 4 need only be reversed for it to become a system for reconstituting the original image format.

Figure 7:
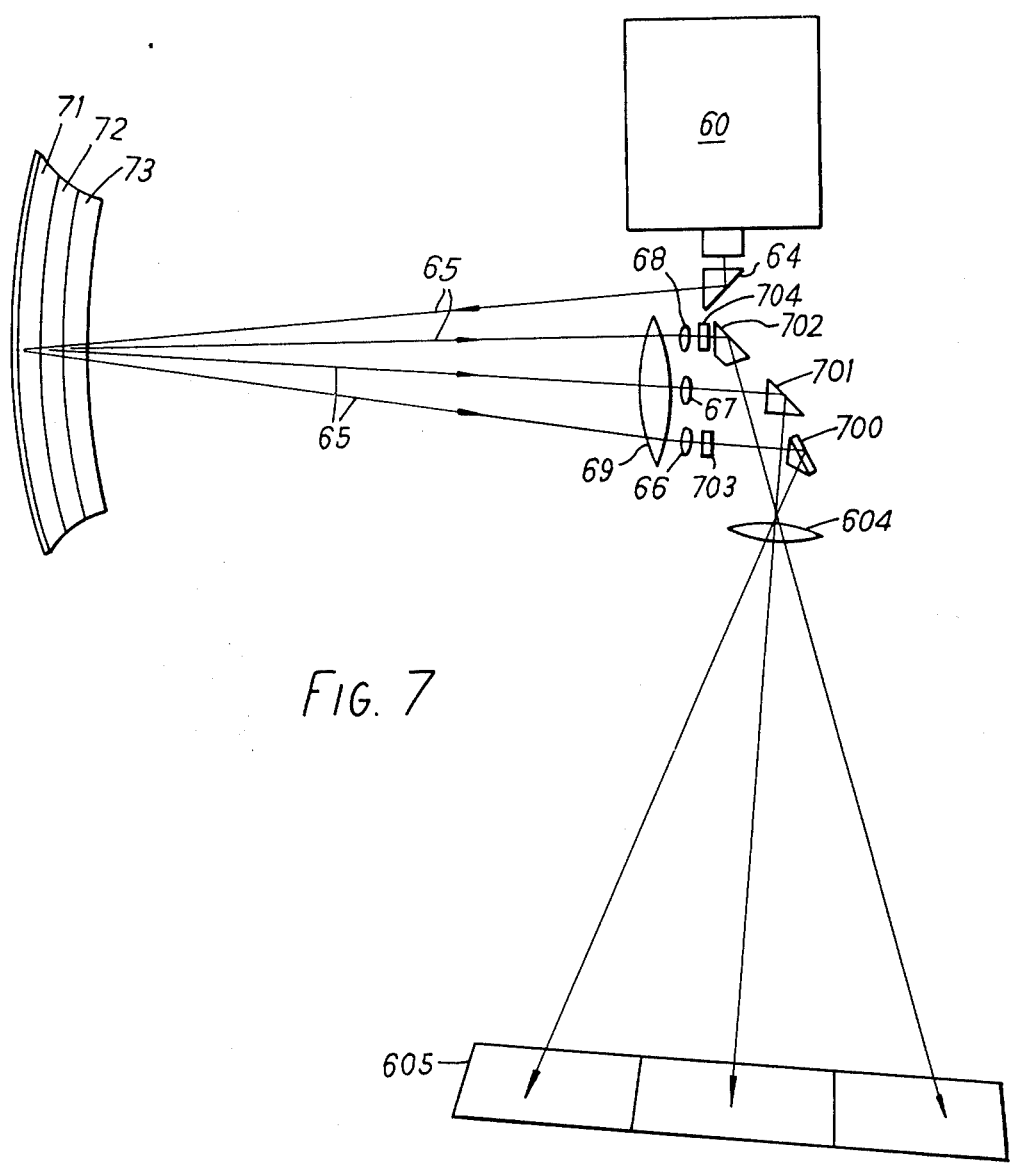
FIG. 7 shows an optical projection system to reconstruct a dissected image, as shown in FIG. 3(b)

FIG. 7 shows an optical projection system which reconstructs the folded square format image of FIG. 3(a) to produce a final image having the original 9:1 format, as shown in FIG. 3(b). The system of FIG. 7 has much in common with the system of FIG. 6, and like features are designated by the same reference numerals in the two figures. A television projector 60 projects an image, via a reflecting prism 64, onto a system of three mirrors, 71, 72 and 73, shaped and positioned each to receive an equal part of the square format image projected. Reflected light is collimated by a lens 69, and separate pupil images are again formed at 66, 67 and 68. The three separate collimated beams fall on a system of three reflecting prisms 700, 701 and 702 and two refracting wedges 703 and 704, which reconstitute the original 9:1 image format as shown in FIG. 3(b). The prism and wedge system is similar in construction to the folding system of FIG. 5, prisms 500, 501 and 502 and wedges 503 and and 504, but with the light paths reversed, so that the folding of the FIG. 5 system is reversed to reproduce the original image format. The reconstituted image is finally projected onto a surface 605 by a lens 604.

It will readily be appreciated from the reading of the foregoing figures, illustrating modes of dissecting a wide angle image and forming an image of square format, together with the corresponding figures describing optical means for performing the particular dissection, that many alternatives are possible. In particular, the choice of inversion and displacement of original picture elements to make up the square-format intermediate image offers readily-achieved alternatives.

Figure 8A:
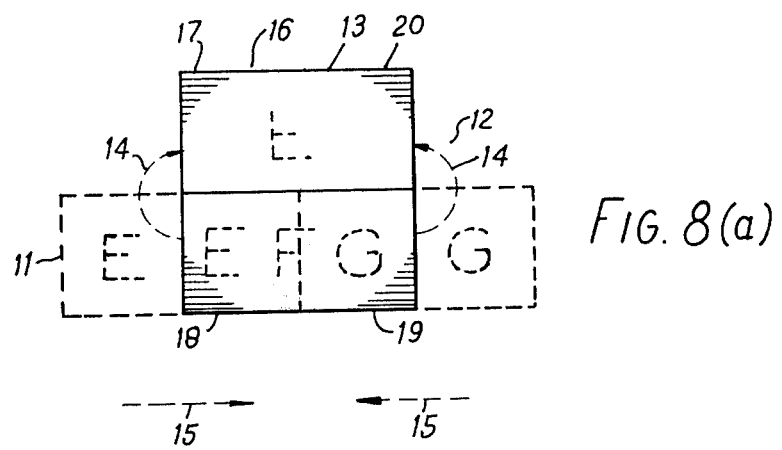
FIGS. 8(a) and 8(b) shows a method of image dissection and reconstruction which is the equivalent of that shown in FIGS. 2(a) and 2(b), but effected by different optical arrangements from those of FIG. 4 and FIG. 6.
Figure 8B:
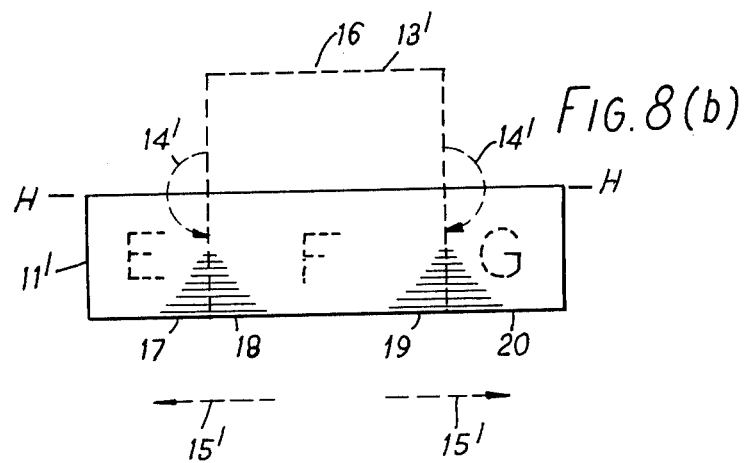

One alternative to the picture dissection and reconstruction mode of FIGS. 2(a) and 2(b) is shown in FIGS. 8(a) and 8(b).

Again, the original wide-angle picture format is 4:1 and comprises picture parts "E", "F" and "G". The central half "F" is inverted about its upper edge, as before. Parts "E" and "G" are merely displaced inwardly, to adjacent positions, without reversal.

Thus, it will be perceived that the essence of the invention is in the choice of original picture format and the manner of its dissection into image parts which, when reassembled, make up the intermediate image of square format. The inversion, or reversal, of picture parts and the lateral displacements used, ae more associated with the optical elements chosen for the practical realisation of any mode of dissection.

What we claim is:

1. An optical display system, for the display of visual images, comprising a first optical system for viewing an object and providing a first image having a first format, a second optical system for dissecting said first image and providing a second image having a second format different from said first format, an electro optic system for viewing the said second image and providing a third image, substantially reproducing said second image parts and having substantially the same (second) format, and a third optical system for viewing the said third image and providing a fourth image substantially reproducing the said fourth image parts and having substantially the same (first) format in which the said first image format and said format (final) image format are both wide-angle image formats, having at least three times as great width as height, and said first image is dissected into and said fourth (final) image is reproduced from at least three image parts separated at boundaries all of which are off-centre with respect to the said first and said fourth (final) images.

2. An optical display system, for the display of visual images, comprising a first optical system for viewing an object and providing a first image having a first format, a second optical system for dissecting said first image and providing a second image having a second format different from said first format, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format in which the said first image format and said fourth (final) image format are both wide-angle image formats, having at least three times as great width as height, and said first image is dissected into and said fourth (final) image is reproduced from at least three image parts separated at boundaries all of which are off-centre with respect to the said first and said fourth (final) images, in which said first and said fourth images are not greater than 4:1 width/height format and said second and said third images are of substantially square format, said first optical system being adapted to invert the central half of said first image about its upper edge and to reverse the outer quarters about their inner edges.

3. An optical display system as claimed in claim 2, in which said first optical system comprises a first refracting prism having three plane faces, associated respectively with the central half and outer quarters of said first image, followed in sequence by a field lens, a collimating lens, one inverting prism and a pair of reversing prisms, associated respectively with the central half and the outer quarters of said first image, and a lens forming said second image upon a target surface.

4. An optical display system, for the display of visual images, comprising a first optical system for viewing an object and providing a first image having a first format, a second optical system for dissecting said first image and providing a second image having a second format different from said first format, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format in which the said first image format and said fourth (final) image format are both wide-angle image formats, having at least three times as great width as height, and said first image is dissected into and said fourth (final) image is reproduced from at least three image parts separated at boundaries all of which are off-centre with respect to the said first and said fourth (final) images, in which said first and said fourth images are not greater than 9:1 width/height format and said second and said third images are of substantially square format, said first optical system being adapted to divide said first image into central and outer thirds to obliquely displace one outer third to a position vertically adjoining the central third and to invert and obliquely displace the other outer third to the opposite position vertically adjoining the central third of said first image.

5. An optical display system as claimed in claim 4, in which said first optical system comprises a first refracting prism having three plane faces, associated respectively with the central and outer thirds of said first image, followed in sequence by a field lens, a collimating lens, three reflecting prisms, a pair of refracting wedges, associated with the outer thirds of said first image, and a lens forming said second image upon a target surface.

6. An optical display system, for the display of visual images, comprising a first optical system for viewing an object and providing a first image having a first format, a second optical system for dissecting said first image and providing a second image having a second format different from said first format, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format in which the said first image format and said fourth (final) image format are both wide-angle image formats, having at least three times as great width as height, and said first image is dissected into and said fourth (final) image is reproduced from at least three image parts separated at boundaries all of which are off-centre with respect to the said first and said fourth (final) images, in which said first and said fourth images are not greater than 4:1 width/height format and said second and said third images are of substantially square format, said first optical system being adapted to invert the central half of said first image about its upper edge and to laterally displace the outer quarters to positions adjacent each other at their inner edges and adjacent said central half at lateral edges.

7. An optical display system, for the projection of visual images onto a viewing screen, comprising a first optical imaging system for viewing an object and providing a first image having a first format, a second optical imaging system including refracting optical elements for dissecting said first image into a plurality of rectangular picture areas and for relatively rearranging the said rectangular picture areas to provide a second sole image having a second format different from said first format, television scanning means for viewing the said second image and providing a third image, substantially reproducing said second image parts and having substantially the same (second) format, and a third optical system including refracting optical elements for viewing the said third image for dissecting said third image into the same said rectangular areas and for projecting a fourth image substantially reproducing the said first image and having substantially the same (first) format, in which the said first image/format and said fourth (final) image format are both wide-angle image formats, having at least three times as great width as height, and said first image is dissected into and said fourth (final) image is reproduced from at least three image parts separated at boundaries all of which are off-centre with respect to the said first and said fourth (final) images.

8. An optical display system, for the display of visual images, comprising a first optical system for viewing an object and providing a first image having a first format, a second optical system for dissecting said first image and providing a second sole image having a second format different from said first format, said second format being substantially square, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format, in which the said first image format and said fourth (final) image format are both wide-angle image formats, having at least three times as great width as height, and said first image is dissected into and said fourth (final) image is reproduced from at least three image parts separated at boundaries all of which are off-centre with respect to the said first and said fourth (final) images, in which the said electro-optic system is a closed-circuit television system and in which the said second optical system is associated with the camera tube of the closed circuit television system to provide the said second image upon the target surface thereof and said television system includes a projection type monitor providing an image from which the said third optical system provides the fourth image upon a projection screen visible to a trainee crew.

* * * * *